United States Patent [19]
Jennings et al.

[11] Patent Number: 6,119,348
[45] Date of Patent: Sep. 19, 2000

[54] AIR GAGING FOR SETTING GAPS IN HYDRODYNAMIC BEARINGS

[75] Inventors: David John Jennings, Santa Cruz; Roger Allen Addy, Gilroy; Wesley R. Clark, Watsonville, all of Calif.

[73] Assignee: Seagate Technology LLC, Scotts Valley, Calif.

[21] Appl. No.: 08/991,686

[22] Filed: Dec. 16, 1997

Related U.S. Application Data

[60] Provisional application No. 60/033,368, Dec. 16, 1996.

[51] Int. Cl.[7] .............................. B21D 53/10; B21K 1/76; B23P 17/00
[52] U.S. Cl. .................................. 29/898.09; 29/407.01; 29/407.05; 29/407.08; 310/90; 384/40
[58] Field of Search ........................... 29/898.02, 407.01, 29/407.05, 407.08, 407.1, 898.09, 603.03, 898.07; 310/90, 90.5; 73/37.5; 384/40

[56] References Cited

U.S. PATENT DOCUMENTS

| | | | |
|---|---|---|---|
| 4,928,029 | 5/1990 | Wright | 310/89 |
| 4,998,033 | 3/1991 | Hisabe et al. | 310/90 |
| 5,127,744 | 7/1992 | White et al. | 384/112 |
| 5,283,491 | 2/1994 | Jabbar et al. | 310/90 |

*Primary Examiner*—David P. Bryant
*Assistant Examiner*—Jermie E. Cozart
*Attorney, Agent, or Firm*—Flehr Hohbach Test Albritton & Herbert LLP

[57] ABSTRACT

A method for setting a gap at or near an optimum width in a hydrodynamic bearing defined between a shaft having end pieces, the end pieces having axially opposing exterior sides which are not parallel, the end pieces being adjustable axially, and a surrounding sleeve comprising independently supporting the shaft and the sleeve to be capable of finely positioned relative motion, in which adjustment is accomplished by moving the shaft and the sleeve together to form the gap with respect to the end pieces and the sleeve and supplying pressurized air to an opening to the gap to cause air to flow through the gap, while monitoring an air pressure drop due to the air flow through the gap while the end pieces are adjusted.

4 Claims, 3 Drawing Sheets

AIR GAGING FOR SETTING GAPS IN HYDRODYNAMIC BEARINGS

CROSS-REFERENCE TO RELATED APPLICATION

This application is based on U.S. Provisional Patent Application, Serial No. 60/033,368 filed Dec. 16, 1996, assigned to the assignee of this application and incorporated herein by reference the priority of which is hereby claimed. This application is especially useful in the assembly of a hydrodynamic motor utilizing a conical bearing such as described in U.S. patent application, Ser. No. 08/981,338, entitled "SPINDLE MOTOR WITH FLUID DYNAMIC BEARING HAVING A JOURNAL IN COMBINATION WITH A CONNICAL BEARING (ONE SIDE OPEN)" invented by Heine, et al. and having a provisional application Serial No. 60/044,100 filed on Apr. 24, 1997 assigned to the assignee of this application and incorporated herein by reference.

FIELD OF THE INVENTION

The present invention relates especially to hydrodynamic bearings, and more specifically to methods and apparatus for the assembly of such bearings which takes into account the close tolerances of such bearings.

BACKGROUND OF THE INVENTION

The use of hydrodynamic bearings in many contexts such as spindle motors for disc drives has become increasingly popular. In a hydrodynamic bearing, a lubricating fluid such as air, gas or oil provides a bearing surface between two relatively rotating members, typically a shaft and surrounding sleeve. Hydrodynamic bearings are characterized by establishing a bearing interface over a large surface area in comparison to a ball bearing assembly which comprises a series of point interfaces. This is desirable because the increased bearing surface reduced wobble or runout between the rotating and fixed members. However, this increased bearing surface also leads to a problem, in that the gap between the fixed and rotating surface can be very small, in the order of 2–7 $\mu$m size gaps. Thus, the tolerances in a hydrodynamic bearing are roughly five times smaller than in a ball bearing. A fixture which can accurately and repeatably set these gaps while allowing for high speed assembly is highly desirable.

SUMMARY OF THE INVENTION

Therefore, it is an object of the present invention to provide an improved apparatus for and method of assembly of a hydrodynamic bearing.

It is a related objective of the invention to create an improved method for accurately setting the gap between the shaft and sleeve which define a hydrodynamic bearing.

A further and related object of the present invention is to provide a method and apparatus for setting the bearing gap in a hydrodynamic bearing without the need for as many small tolerances on individual bearing components as normally associated with such an assembly.

These and other objectives and advantages of the present invention are achieved by utilizing an air gage to measure the pressure drop (and indirectly the flow rate) of air through the bearing; while facing sections of the air bearing are moved closer together. The measured pressure drop can be correlated to the actual bearing gap and monitored to determine when the proper gap has been achieved.

More particularly, the inner and outer elements of the bearing are clamped in separate carriers and are held in place. The carriers are then moved toward one another so that the inner or shaft portion of the bearing slides into the outer or sleeve portion of the bearing. To accurately set the gap between the two, an air hose with an air gage attached to it is attached to one end of the bearing gap; air is pumped through the bearing gap, exiting through the opposite end of the gap. Preferably, an air gage is attached which is of the type which can be calibrated to register 0 when the air flow into one end of the gap equals the air flow out the other end of the gap. By testing a set of reference motor parts, a high end and a low end of an acceptable bearing gap range can be established, and the corresponding air gage readings obtained. Thus, once the air gage has been calibrated against a minimum and maximum gap, each motor can be assembled with the proper gap by simply adjusting the relative position of the parts until a target air gage reading or a reading between the high and low end of an acceptable range is obtained.

Other features and advantages of the present invention would become apparent to a person of skill in the art who studies the present invention disclosure. Therefore, a more detailed description of a preferred embodiment of the invention is given with respect to the following drawings.

DETAILED DESCRIPTION OF A PREFERRED EMBODIMENT

Figure 1:
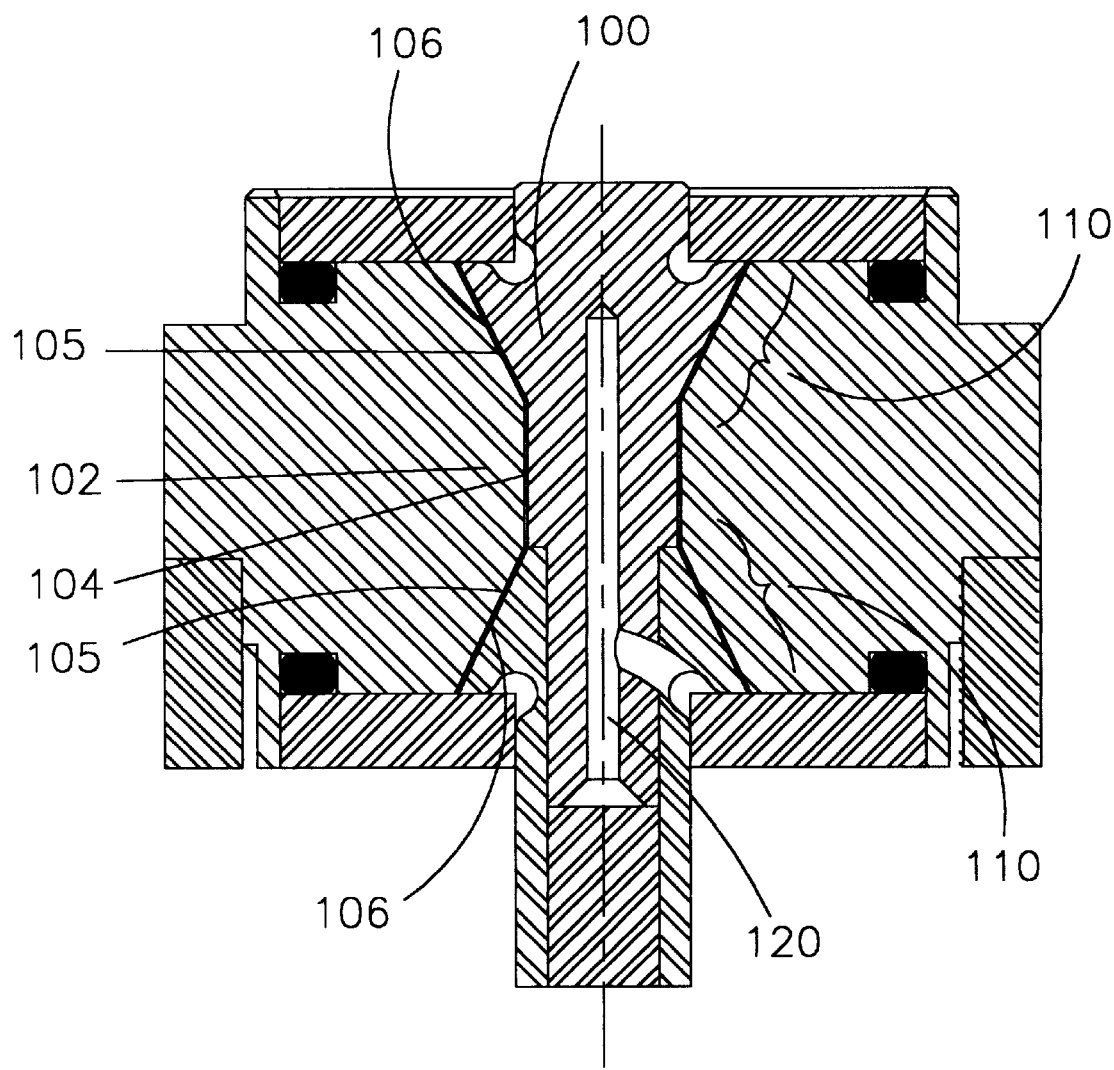
FIG. 1 is a vertical sectional view of a exemplary conical bearing with which the present invention is useful.

FIG. 1 is a vertical sectional view of a typical conical bearing with which the present invention is useful in assembling the bearing. Clearly, this method and apparatus is not limited to use with a particular design of conical bearing; and in fact the method may well lend itself to the assembly of thrust plate type of hydrodynamic bearings. The present example is given to demonstrate the use of the method with one type of bearing. This particular example is described with respect to U.S. patent application, Ser. No. 09/043,066 entitled "CONICAL HYDRODYNAMIC BEARING WITH TWO INDEPENDENT CIRCULATION PATHS" invented by Jennings, et al. and based on U.S. Provisional application Serial No. 60/034,265 filed Dec. 20, 1996 which is incorporated herein by reference. For purposes of discussion of this invention, it is sufficient to note that the hydrodynamic bearing comprises a shaft 100 having a sleeve 102 which in this case rotates around a shaft. Gaps 104 in which fluid is located to allow the free rotation of the sleeve relative to the shaft are shown defined by their respective walls, i.e. the bearing face 105 of the shaft 100 and bearing face 106 proximate shaft 100. The width of this gap 104 must be set typically on the order of 2–7 $\mu$m; and it is especially difficult to set this gap distance in the conical region 110. It can be seen from an inspection of FIG. 1 that bearing gap in region 110 can be adjusted by axially adjusting the relative axial position of the sleeve 102 and the shaft 100. The inventor of the present invention has realized that as the gap changes, the rate of air flow, especially air flow under pressure, changes to a degree that can be measured. By following the teachings of this invention, fixturing which uses air flow and air flow measurement techniques can be used to control the gaps during assembly. Using an assembly tool as shown in FIGS. 2 and 3, and air gaging equipment, the critical bearing gaps especially in the region 110 can be accurately controlled.

Figure 2:
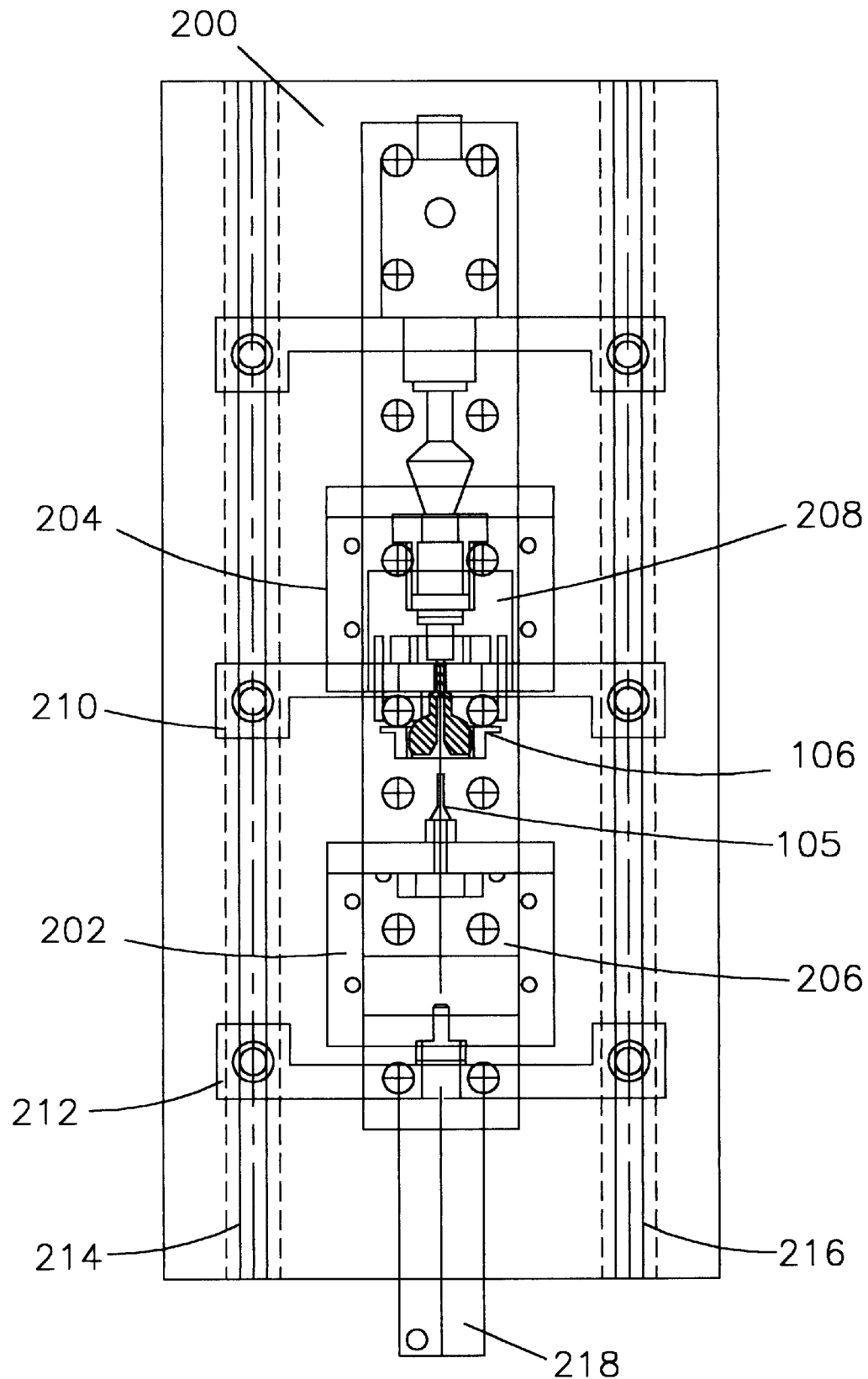
FIG. 2 is a top plan view of the fixture of the present invention which is used to mount the two sections of the hydrodynamic bearing.

Referring next to FIG. 2, the support frame 200 on which the motor is assembled is shown. To assemble the motor, the shaft and sleeve 100, 102 are clamped to separate carriers 202, 204. The bearing elements which typically comprise, at least in part, a shaft and sleeve 100, 102 are held in place by dowel pins and magnets on magnetic bases 206, 208. These bases may be moved axially relative to one another utilizing support legs 210, 212 which travel along rails or the like 214, 216 so that as the pieces are moved axially, no radial misalignment occurs. When the pieces have moved very close together, a micrometer 218 of a type which is well known in this field and which is attached to one of the bases 206, 208 is used to make very fine changes in the axial position of one of the conical bearing faces 105, with respect to the other bearing face 106 so that the relative axial positioning of the two pieces can be very accurately established. It is well known that an aligment frame 200 of the type generally described herein using the micrometer 218 is capable of making adjustments in the axial direction on the order of ¼ μm; this specific design of this frame does not form a specific part of the invention, but it is disclosed as an example of a frame for accurately aligning the two pieces.

Figure 3:
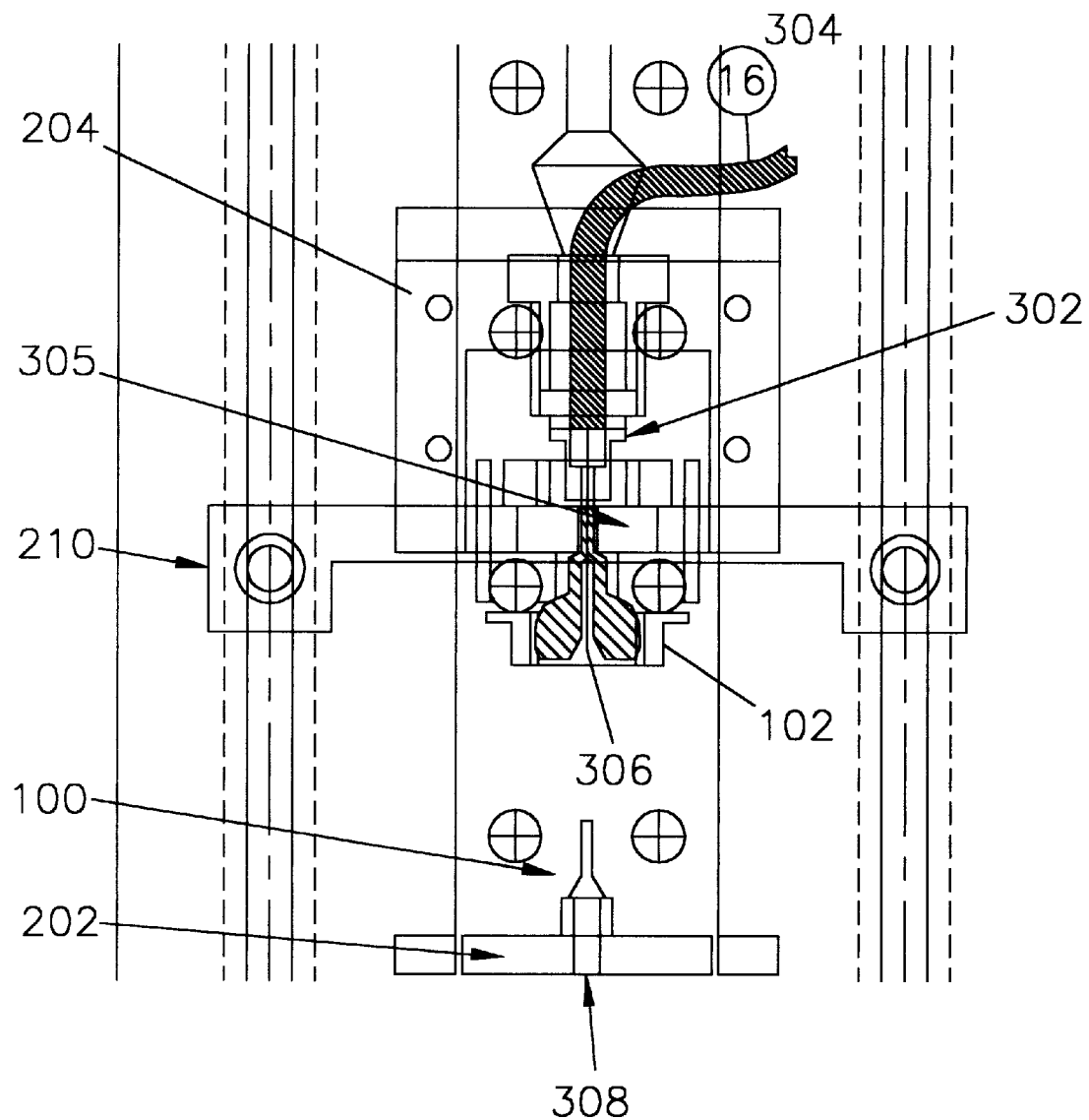
FIG. 3 is an expanded view of FIG. 2, showing the relative positions of the two sections of the hydrodynamic bearing as well as the attachment of the air hose and air gage to the hydrodynamic bearing.

More specifically, referring to FIG. 3, which is an expanded view of FIG. 2, the base 202 is advanced toward the base 204 as the shaft 100 slides within the sleeve 102 as shown in FIG. 1. The micrometer 218 is then used to very accurately, axially position the shaft 100 relative to the sleeve 102 so that the radial gap in region 110 is accurately set. To measure this bearing gap 110, an air gage 304 is connected to one end 302 (see FIG. 3) of one of the pieces of the hydrodynamic bearing to be assembled. This end is now sealed off by the air hose connection, the air hose ending in a tapered seat against which the end 302 of the hydrodynamic bearing rests; this seat is spring-loaded, the spring being inside a nut 305 attaching the hose to the end of hydrodynamic bearing sleeve 102, so that no air bleeds out at the end 302 of the hydrodynamic bearing. Air is injected by the hose into the bearing using a needle 306 which can be inserted into the central reservoir 120 (see FIG. 1) of the hydrodynamic bearing. Alternatively, the air could be directly injected into the end of the bearing, especially in cases where no central reservoir is provided in the shaft. In either event, the only path for the air to leave the bearing is through the bearing gap, and out the upper end 308. In order to keep the measurements accurate, it may be necessary to provide a sealing ring to seal off the journal bearing above the conical bearing and above the region where the gap is to be measured.

To carry out the process, air is pumped through the air inlet end 302, with the air gage 304 showing the pressure drop against the bearing. The pressure gage reading can be calibrated against at least two reference motor parts, one of which is preset for the high end of the acceptable bearing gap range, and the other being preset for the low end of the bearing gap range. The air gage can then be adjusted so that it reads zero when the gap falls between this range. Thus, once the air gage has been calibrated, motors can be assembled with the proper gap by simply placing the two parts of the hydrodynamic bearing in the fixture, pumping air through the gap and adjusting the micrometer 218 (FIG. 2) until the air gage dial reads zero.

Alternatively, rather than adjusting until the dial reads zero (or some other fixed standard number), readings can be taken on the air gage for reference bearing parts prefixed at the maximum and minimum allowable gaps. When the gage is attached to these reference parts, pressure readings can be taken; these pressure readings would establish the high and low reference numbers, and a desired gap setting would be achieved for all motor parts being assembled when the gage, for a given input air pressure, has a reading between these numbers.

Other features and advantages of the present invention may become apparent to a person of skill in the art who studies this disclosure. As already mentioned, this method is equally as useful with radial thrust bearings as with conical bearings. The method could entail monitoring air flow rate rather than air pressure. Other alternatives may also become apparent. Therefore, the scope of the present invention is to be limited only by the following claims.

What is claimed is:

1. A method for setting a gap at or near an optimum width in a hydrodynamic bearing defined between a shaft and a surrounding sleeve comprising independently supporting said shaft and said sleeve to be capable of finely positioned relative motion;

moving said shaft and said sleeve together to form said gap;

supplying pressurized air to a first opening in said gap to cause air to flow through said gap;

monitoring an air pressure drop due to said air flow through said gap while carrying out the moving step and comparing the air pressure drops to a preset standard to set said gap at or near the optimum width.

2. A method as claimed in claim 1, wherein said bearing comprises a shaft having at least a first axial bearing ending in said first opening, and a conical bearing formed between said shaft and said sleeve adjacent said axial bearing, said gap being measured between said shaft and said sleeve along said conical bearing.

3. A method as claimed in claim 1, wherein said monitoring step comprises monitoring air flow through said gap.

4. A method as claimed in claim 3, wherein said monitoring step comprises monitoring air pressure in said gap.

* * * * *